US011643609B2

(12) United States Patent
Daggupati et al.

(10) Patent No.: US 11,643,609 B2
(45) Date of Patent: May 9, 2023

(54) PROCESS AND A SYSTEM FOR PRODUCING SYNTHESIS GAS

(71) Applicant: RELIANCE INDUSTRIES LIMITED, Mumbai (IN)

(72) Inventors: Sateesh Daggupati, Khammam (IN); Clifton Gregg Keeler, Spring, TX (US); Sukumar Mandal, Faridabad (IN); Asit Kumar Das, Faridabad (IN); Sachchit Kumar Majhi, Kashmar (IN); Ajay Gupta, Jamnagar (IN); Ajit Vish Sapre, Tampa, FL (US)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 532 days.

(21) Appl. No.: 16/321,506

(22) PCT Filed: Aug. 4, 2017

(86) PCT No.: PCT/IB2017/054776
§ 371 (c)(1),
(2) Date: Jan. 29, 2019

(87) PCT Pub. No.: WO2018/025227
PCT Pub. Date: Feb. 8, 2018

(65) Prior Publication Data
US 2019/0169513 A1 Jun. 6, 2019

(30) Foreign Application Priority Data
Aug. 4, 2016 (IN) .............................. 201621026684

(51) Int. Cl.
*C10J 3/48* (2006.01)
*C01B 3/44* (2006.01)
(Continued)

(52) U.S. Cl.
CPC .................................... *C10J 3/48* (2013.01);
*C01B 3/44* (2013.01); *C10J 3/721* (2013.01);
*C10K 1/007* (2013.01);
(Continued)

(58) Field of Classification Search
CPC ......................................................... C10J 3/48
(Continued)

(56) References Cited

U.S. PATENT DOCUMENTS

2010/0181539 A1* 7/2010 Apanel .................. C10K 1/004
252/373
2011/0262323 A1* 10/2011 Rappas ................. C22B 34/225
423/63

(Continued)

FOREIGN PATENT DOCUMENTS

CA          2713661 C       7/2013
WO     2009/086366 A1       7/2009
(Continued)

OTHER PUBLICATIONS

Niessen et al. (NPL, NREL/TP-430-21612, 1996) (Year: 1996).*
(Continued)

*Primary Examiner* — Douglas B Call
(74) *Attorney, Agent, or Firm* — Ladas & Parry LLP

(57) ABSTRACT

The present disclosure relates to a process and a system for producing synthesis gas. The carbonaceous feedstock is gasified, in the presence of at least one of oxygen and steam, in a first reactor to obtain a gaseous mixture comprising H2, CO, CH4, CO2, H2O, tar and char. The gaseous mixture is treated in a second reactor, in the presence of a catalyst, to obtain synthesis gas. The system comprises a first reactor, a connecting conduit, a second reactor, at least one cyclone separator, at least one heat exchanger and at least one synthesis gas filter unit. The process and the system of the
(Continued)

Figure 1:
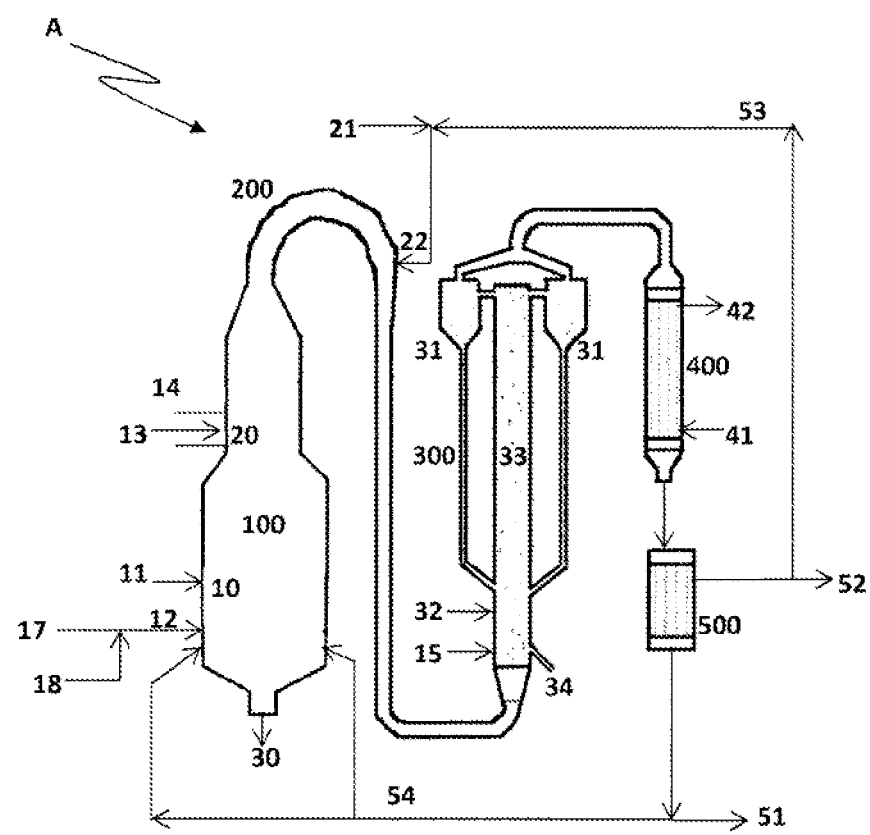

present disclosure are capable of producing synthesis gas with comparatively higher conversion of the unreacted char.

5 Claims, 2 Drawing Sheets

(51) Int. Cl.
    *C10J 3/72*     (2006.01)
    *C10K 1/02*     (2006.01)
    *C10K 3/02*     (2006.01)
    *C10K 1/00*     (2006.01)
    *C10K 1/04*     (2006.01)

(52) U.S. Cl.
    CPC ............... *C10K 1/024* (2013.01); *C10K 1/04* (2013.01); *C10K 3/02* (2013.01); *C10K 3/023* (2013.01); *C01B 2203/042* (2013.01); *C01B 2203/0465* (2013.01); *C10J 2300/093* (2013.01); *C10J 2300/0916* (2013.01); *C10J 2300/0943* (2013.01)

(58) Field of Classification Search
    USPC ........................................................ 252/373
    See application file for complete search history.

(56) References Cited

U.S. PATENT DOCUMENTS

2015/0299590 A1* 10/2015 Keeler ................. C10K 1/005
    252/373
2015/0361362 A1* 12/2015 Daggupati ............. C10J 3/463
    252/373

FOREIGN PATENT DOCUMENTS

WO     WO2014/004646   *  1/2014
WO     2014/122668 A1    8/2014

OTHER PUBLICATIONS

Karimipour et al. (NPL, Fuel V 103, pp. 308-320, 2013) (Year: 2013).*

International Search Report of the corresponding PCT application No. PCT/IB2017/054776.

Written Opinion of the corresponding PCT application No. PCT/IB2017/054776.

* cited by examiner

PROCESS AND A SYSTEM FOR PRODUCING SYNTHESIS GAS

RELATED APPLICATION

This application is a national phase entry under 35 USC 371 of International Patent Application No.: PCT/IB2017/054776 filed on 4 Aug. 2017, which claims priority from Indian Application No. 201621026684 filed on 4 Aug. 2016, the disclosures of which are incorporated in their entirety by reference herein.

FIELD

The present disclosure relates to the field of chemical engineering. Particularly, the present disclosure relates to a process and a system for producing synthesis gas.

Definitions

As used in the present disclosure, the following terms are generally intended to have the meaning as set forth below, except to the extent that the context in which they are used indicate otherwise.

Synthesis gas: The term "synthesis gas" is also known as syngas and refers to a fuel gas mixture consisting primarily of hydrogen, carbon monoxide, and very often carbon dioxide.

Gasification: The term "gasification" refers to a process that converts organic or fossil fuel based carbonaceous materials or a mixture thereof into carbon, monoxide, hydrogen and carbon dioxide. This is achieved by treating or partially oxidizing the carbonaceous materials at high temperatures (>650° C.) with a controlled amount of at least one of oxygen and steam.

BACKGROUND

Gasification is a process which is used to convert a carbonaceous feedstock into a valuable gaseous mixture called synthesis gas (syngas) comprising primarily $H_2$ and CO, in the presence of steam, oxygen and/or air and at a very high temperature and pressure. The carbonaceous feedstock can be coal, lignite, petroleum coke, residue from petroleum processes, biomass, municipal and/or industrial wastes.

Synthesis gas can be used in varied applications such as generating power, producing chemicals, synthesizing liquid fuels, hydrogen, and as a source for producing natural gas.

Gasification processes to produce synthesis gas are known in the art. However, the processes known in the art have some drawbacks or disadvantages such as high residence time, low solid flow rate, inferior heating value (low molar ratio of $H_2/CO$) and deposition of the fouling material, in process equipment thereby reducing the service life of the process equipment. Further, in the processes known in the art, recycling of the unconverted feedstock in a reactor or gasifier is required due to the lower conversion rate of the carbonaceous feedstock. In addition, volatile heavy metals that are present in the carbonaceous feedstocks, cause fouling and scaling in the downstream units.

In order to overcome the above mentioned drawbacks, some of the processes disclosed in the art suggest a catalytic gasification process to obtain a higher conversion rate, higher molar ratio of $H_2/CO$ in the syngas; and also reduce the corrosive heavy metal content. However, in the processes known in the art, a catalyst is impregnated or coal/coke. The impregnation of the catalyst on coal/coke causes the problem of catalyst recovery and reuse. The recovery of the catalyst can be achieved by water leaching. However, this results in the partial recovery of the catalyst, which in turn increases the overall cost of producing synthesis gas.

There is, therefore, felt a need for a process and a system to produce synthesis gas that obviate the above mentioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a process for producing synthesis gas with higher molar ratio of $H_2/CO$.

Another object of the present disclosure is to provide a system for producing synthesis gas.

Yet another object of the present disclosure is to provide a process and a system, for producing synthesis gas that are economical.

Other objects and advantages of the present disclosure will be more apparent from the following description, which is not intended to limit the scope of the present disclosure.

SUMMARY

The present disclosure provides a process for producing synthesis gas with increased $H_2$ to CO molar ratio from a carbonaceous feedstock. The process comprises gasifying the carbonaceous feedstock in a first reactor, in the presence of at least one of oxygen and steam, at a temperature in the range of 850° C. to 1800° C. and at a pressure in the range of 1 bar to 60 bar, to obtain a gaseous mixture comprising $H_2$, CO, $CH_4$, $CO_2$, $H_2O$, char and tar where the $H_2$ to CO molar ratio is less than 1.2. The gaseous mixture is gasified in a second reactor with at least one of steam, $CO_2$, CO and hydrogen, in the presence of a catalyst comprising alkali metal salt impregnated on silica-alumina support, at a temperature in the range of 600° C. to 850° C. and at a pressure in the range of 1 bar to 60 bar, to obtain synthesis gas with $H_2/CO$ molar ratio being in the range of 1.5 to 6.

The process further comprises a process step of capturing heavy metals including vanadium and nickel of the gaseous mixture with the catalyst.

The process comprises gasifying the carbonaceous feedstock is gasified its a primary zone of the first reactor having a temperature in the range of 900° C. to 1800° C.; and an additional portion of the carbonaceous feedstock is gasified in a secondary zone of the first reactor (100) having a temperature in the range of 850° C. to 1700° C.

The process further comprises a process step of cooling the gaseous mixture with water to a temperature less than 800° C. before introducing the gaseous mixture to the second reactor.

The residence time of the carbonaceous feedstock in the first reactor can be in the range of 5 seconds to 300 seconds.

The residence time of the gaseous mixture in the second reactor can be in the range of 60 seconds to 600 seconds.

The alkali metal salt is $K_2CO_3$ and the amount of $K_2CO_3$ can be in the range of 10 wt % to 60 wt % of the total catalyst composition. The molar ratio of steam to the carbonaceous feedstock in the first reactor can be in the range of 1:1 to 1:4.

The ratio of the catalyst to the gaseous mixture in the second reactor can be in the range of 5:1 to 60:1 by mass.

The first reactor and the second reactor can be operated in a fluidization regime selected from the group consisting of a dense bed, a bubbling bed, a turbulent bed, a fast fluidization bed, a pneumatic transport and an entrained bed.

The flow pattern of the gaseous mixture and the catalyst in the second reactor can be one of counter-current and co-current.

The conversion efficiency of char and tar to the synthesis gas in the second reactor can be greater than 90%.

The carbonaceous material can be at least one selected from the group consisting of petroleum coke, coal, petroleum residue, biomass and wood.

The present disclosure also provides a system for producing synthesis gas from a carbonaceous feedstock. The system comprises a first reactor, a connecting conduit, and a second reactor.

The first reactor is adapted for receiving the carbonaceous feedstock and at least one of oxygen and steam; and producing a gaseous mixture comprising $H_2$, CO, $CH_4$, $CO_2$, $H_2O$, tar and char.

The connecting conduit is configured for receiving and transferring the gaseous mixture from the first reactor.

The second reactor is adapted for receiving the first gaseous mixture from the connecting conduit; and producing synthesis gas.

The first reactor and the second reactor are fluidized bed reactors.

The first reactor can be a gasifier selected from the group consisting of a down-flow gasifier and an up-flow gasifier; and the second reactor can be a catalytic circulating fluidized bed reactor.

The system further comprises at least one cyclone separator, wherein the cyclone separator is configured for receiving the synthesis gas with a portion of char and the catalyst entrained therein; and separating the portion of char and the catalyst from the synthesis gas.

The system further comprises at least one heat exchanger, wherein the heat exchanger is configured to extract heat from the synthesis gas by circulating water therethrough; and generate steam.

The system further comprises at least one synthesis gas filter unit, wherein the synthesis gas filter unit is configured for receiving the synthesis gas from the heat exchanger; and removing at least a portion of fly ash entrained in the synthesis gas.

BRIEF DESCRIPTION OF THE ACCOMPANYING DRAWING

Figure 2:
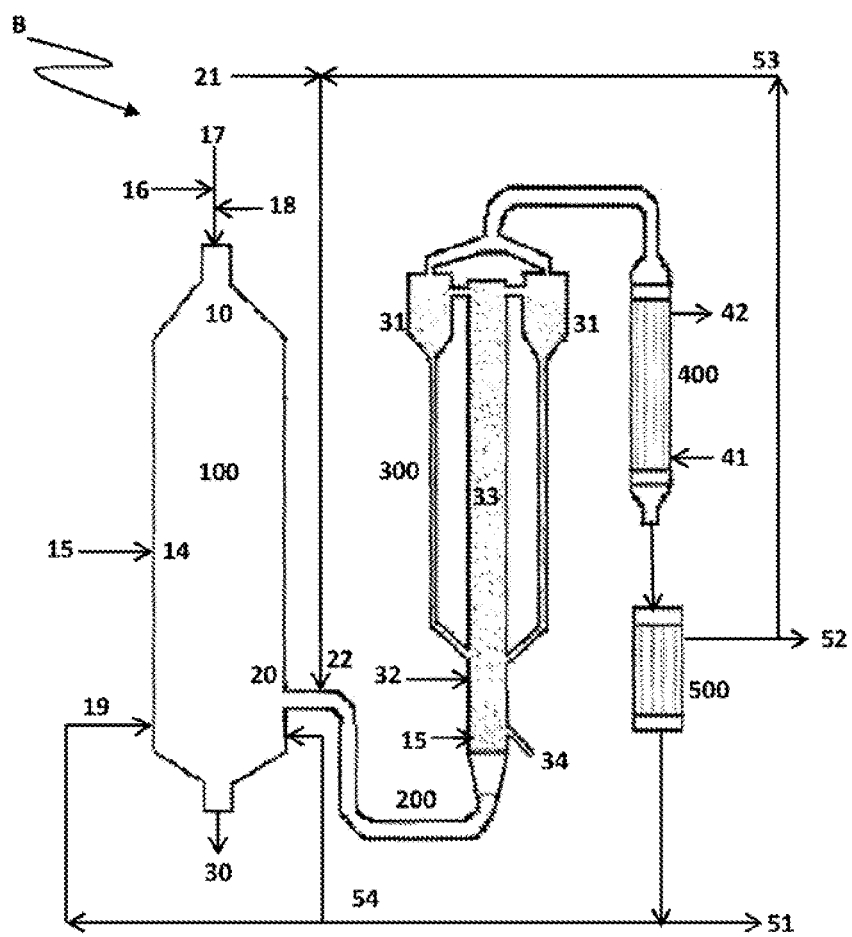

The present disclosure will now be described with the help of the accompanying drawing, in which:

FIG. 1 illustrates a system (A) for producing synthesis gas from a carbonaceous feedstock in accordance with one embodiment of the present disclosure; and FIG. 2 illustrates a system (B) for producing synthesis gas from, a carbonaceous feedstock in accordance with another embodiment of the present disclosure.

| Reference Numerals | |
|---|---|
| System | A, B |
| First reactor | 100 |
| Primary zone | 10 |
| Inlets | 11, 12, 14, 15, 32 |
| Additional carbonaceous feedstock | 13 |
| Appropriate location | 14 |
| Carbonaceous feedstock | 16 |
| $O_2$ | 17 |
| Steam | 18 |
| Secondary zone | 20 |
| Water | 21 |
| Molten slag | 30 |
| At least one cyclone separator | 31 |
| Catalyst bed | 33 |
| Outlet | 34 |
| Cold water | 41 |
| Steam (produced from a heat exchanger) | 42 |
| Particulate matter and/or ash | 51 |
| Synthesis gas | 52 |
| A portion of the synthesis gas | 53 |
| A portion of the particulate matter and/or ash | 54 |
| Connecting conduit | 200 |
| Second reactor | 300 |
| Heat exchanger | 400 |
| At least one synthesis gas filter unit | 500 |

DETAILED DESCRIPTION

As described herein above, there are certain drawbacks associated with conventional processes for gasifying carbonaceous feedstocks, such as the carbon conversion efficiency is less; recovery of the heat released during the gasification is significantly less; and high amount of sticky ash particles are generated due to the presence of volatile metal vapors.

The present disclosure, therefore, envisages a process and a system for producing syngas and obviating the above mentioned drawbacks associated with the conventional processes.

The system (A, B) is described with reference to FIGS. 1 and 2.

The system (A, B) comprises a first reactor (100), a connecting conduit (200), a second reactor (300), at least one cyclone separator (31), at least one heat exchanger (400) and at least one synthesis gas filter unit (500).

The first reactor (100) can be a gasifier selected from the group consisting of a down-flow gasifier and an up-flow gasifier. In case of the up-flow gasifier, the carbonaceous feedstock (16), $O_2$ (17) and steam (18) are introduced from an operative bottom portion of the first reactor (100) (as shown in FIG. 1). In case of the down-flow gasifier, the carbonaceous feedstock (16), $O_2$ (17) and steam (18) are introduced from an operative top portion of the first reactor (100) (as shown in FIG. 2).

The second reactor (300) can be a catalytic circulating fluidized bed reactor. The second reactor (300) comprises a catalyst bed (33), wherein a catalyst compromising $K_2CO_3$ impregnated silica-alumina support is continuously circulated in the second reactor (300).

The first reactor and the second reactor are fluidized bed reactors.

The process of the present disclosure is described herein below with reference to FIGS. 1 and 2.

The carbonaceous feedstock (16) is introduced into the first reactor (100) via an inlet (11) configured thereon. The carbonaceous feedstock (16) is gasified, at a temperature in the range of 850° C. to 1800° C. and at a pressure in the range of 1 bar to 60 bar, by introducing at least one of oxygen (17) and steam (18) in the first reactor (100) via an inlet (12) configured thereon, to obtain a gaseous mixture comprising $H_2$, CO, $CH_4$, $CO_2$, $H_2O$, tar, char, volatile heavy metals and particulate matter. Particularly, the carbonaceous feedstock (16) is introduced into a primary zone (10) of the first reactor (100), wherein it is gasified at a temperature in the range of 900° C. to 1800° C. During the present step, molten slag (30) is produced which is removed from an operative bottom portion of the first reactor (100).

In accordance with the present disclosure, an additional portion of the carbonaceous feedstock (13) is introduced into a secondary zone (20) of the first reactor (100) via an inlet (14) configured thereon. The additional portion of the carbonaceous feedstock (13) is gasified at a temperature 850° C. to 1700° C. to produce an additional amount of the gaseous mixture comprising $H_2$, CO, $CH_4$, $CO_2$, $H_2O$, tar, char, volatile heavy metals and particulate matter, by utilizing the heat of fee gaseous mixture rising upward from the primary zone (10) of the first reactor (100). In the gaseous mixture, the molar ratio of $H_2$, CO is less than 1.2.

The residence time of the carbonaceous feedstock (16) in the first reactor (100) is in the range of 5 seconds to 300 seconds.

The molar ratio of at least one of oxygen (17) and steam (18) to the carbonaceous feedstock (16) in the first reactor (100) is in the range of 1:1 to 1:4.

The at least one of oxygen (17) and steam (18) is introduced into the first reactor (100) at a superficial velocity ranging from 0.5 m/s to 5 m/s.

The carbonaceous material is at least one selected from the group consisting of petroleum coke, coal, petroleum residue, biomass and wood.

The gaseous mixture from the first reactor (100) is introduced or received in the connecting conduit (200). Before introducing the gaseous mixture to the second reactor (300), the gaseous mixture is cooled to a temperature less than 800° C., particularly to a temperature in the range of 600° C. to 800° C. by circulating water (21) through the connecting conduit (200).

The gaseous mixture is introduced or received in the second reactor (300). The gaseous mixture is gasified in the second reactor (300), in the presence of the catalyst comprising alkali metal salt impregnated on silica-alumina support and, at a temperature in the range of 600° C. to 850° C. and at a pressure in the range of 1 bar to 60 bar, by introducing at least one of steam, $CO_2$, CO and hydrogen via an inlet (15) configured on the second reactor (300), to obtain synthesis gas with $H_2$/CO molar ratio being in the range of 1.5 to 6. Depending upon the requirement, the make-up catalyst can be introduced in the second reactor (300) through an inlet (32) configured thereon. The used up catalyst can be withdrawn from the second reactor (300) via an outlet (34) configured thereon.

Particularly, due to the catalyst:
char and tar present in the gaseous mixture gets converted into synthesis gas; and
molar ratio of $H_2$ to CO in the product gas will be enhanced due to the acceleration of water-gas shift reaction kinetics which leads to more hydrogen formation i.e CO is further reacted with steam and produces $H_2$ and $CO_2$.
a portion of the volatile heavy metals in the gaseous mixture is adsorbed by the catalyst, thereby reducing fouling and sealing issues in downstream unite such as the heat exchanger (400).

The catalyst facilitates in accelerating the kinetics of the water gas reaction. Due to this, the hydrogen content in the final composition of the synthesis gas can be improved or controlled. In accordance with the present disclosure, the ratio of hydrogen to carbon monoxide in the synthesis gas is greater than 1.5. Depending upon the requirement, it is also possible to increase the amount of methane along with the synthesis gas by using a methanation catalyst (typically nickel based catalyst) along with the catalyst of the present disclosure.

The alkali metal salt is $K_2CO_3$ and the amount of $K_2CO_3$ is in the range of 10 wt % to 60 wt % with respect to the total catalyst composition.

The residence time of the gaseous mixture in the second reactor (300) is in the range of 60 seconds to 600 seconds.

The catalyst is circulated in the second reactor (300) at a space velocity ranging from 0.2 $hr^{-1}$ to 60 $hr^{-1}$.

The ratio of the catalyst to the gaseous mixture in the second reactor (300) is in the range of 5:1 to 60:1 by mass. In accordance with one embodiment of the present disclosure, the ratio of the catalyst to char in the gaseous mixture is in the range of 5:1 to 60:1 by mass.

The flow pattern of the gaseous mixture and the catalyst in the second reactor (300) is one of counter-current and co-current.

The first reactor (100) and the second reactor (300) are operated in a fluidization regime selected from the group consisting of a dense bed, a bubbling bed, a turbulent bed, a fast fluidization bed, a pneumatic transport and an entrained bed.

The synthesis gas leaving the second reactor (300) comprises a portion of char, catalyst and the particulate matter and/or ash. The syngas leaving the second reactor (300) is introduced into at least one cyclone separator (31) for separating the portion of char and catalyst from the synthesis gas. The separated portions of char and catalyst are re-circulated into the second reactor (300) for producing synthesis gas.

The synthesis gas leaving the cyclone separator (31) is introduced into at least one heat exchanger (400), wherein the synthesis gas is cooled to a temperature in the range of 200° C. to 400° C. by circulating cooling water (41) through the heat exchanger (400) to obtain a cooled synthesis gas. In the heat exchanger (400), the heat of the synthesis gas is utilized or absorbed by the cooling water (41) to produce steam (42). Depending upon the requirement, the steam (42) can be used as a heating source in various industrial applications such as heating process fluids.

The cooled synthesis gas leaving the heat exchanger is introduced into at least one synthesis gas filter unit (500). In the synthesis gas filter unit (500), the particulate matter and/or ash (51) entrained in the cooled synthesis gas is separated to produce synthesis gas (52) with no impurities entrained therein. A portion of the particulate matter and/or ash (53) can be re-circulated into the first reactor (100) for gasification thereof. A portion of the synthesis gas (53) can be re-circulated into the connecting conduit (200) and a remaining portion of the synthesis gas can be stored for further use.

The process of the present disclosure is an integrated process, wherein, the gasification in the first reactor (100) is integrated with the catalytic process in the second reactor (300).

Since, it is possible to carry out a catalytic reaction, methanation and/or water-gas shift reaction in a single reactor (particularly the second reactor (300)) comprising $K_2CO_3$ impregnated catalyst, the requirement of a separate reactor for carrying out each of the mentioned reactions is reduced. This facilitates in decreasing the load on a shift reactor for water-gas shift reaction and a methanation reactor for methanation, and minimizing the capital expenditure (CAPEX) and operational expenditure (OPEX) for the shift reactor and the methanation reactor.

The process and the system of the present disclosure are capable of efficiently converting the carbon content of the carbonaceous feedstock (16) to synthesis gas. The process and the system of the present disclosure are capable of improving or controlling the final composition, of synthesis gas by increasing either the content of hydrogen or methane. Moreover, the process and the system of the present disclosure are capable of achieving the conversion efficiency of char to synthesis gas in the second reactor (300) greater than 90%.

The present disclosure is further described in light of the following laboratory experiments which are set forth for illustration purpose only and not to be construed for limiting the scope of the disclosure. The following laboratory experiments can be scaled up to industrial/commercial scale and the results obtained can be extrapolated to industrial scale.

EXPERIMENTS

Experiment 1

(a) Preparation of Char

Pet coke was dried at a temperature of 60° C. and then crushed to produce pet coke in powder form having a size in the range of 500 microns to 1 mm. The powdered pet coke was introduced into a furnace under an inert atmosphere of nitrogen to remove the air present in the furnace. The powdered pet coke was then heated at 110° C. for 1 hour to remove the moisture present in the powdered pet coke. Further, the temperature of the furnace was increased to 1400° C. at a rate of 30° C./min and a pressure of 1 bar was maintained for preparing char. The temperature of 1400° C. was maintained for 30 minutes so that all the volatile matter present in the pet coke was released. The released gases were analyzed using a gas chromatograph to confirm the completion of the pyrolysis reaction. The char thus obtained was cooled and reduced to a particle size of less than 150 µm, before using the char in the gasification experiment. Under the same process conditions, coal char from subbituminous coal and biomass char from wood sawdust were also prepared for further use in the gasification experiment.

(b) Preparation of the Catalyst

Incipient wetness impregnation method was used to prepare the alkali ($K_2CO_3$) supported catalyst. 50 gms of $K_2CO_3$ and 50 gms of spray dried silica-alumina microspheres support particles were taken. The properties of the $K_2CO_3$ and the silica-alumina support used for the preparation of the catalyst are summarized in Table 1 provided herein below.

TABLE 1

| Sr. No | Material | Specifications | Surface area ($m^2/g$) | Pore vol ($cm^3/g$) | Pore Dia (°A) | Attrition Index (%) | Particle size (µm) |
|---|---|---|---|---|---|---|---|
| 1. | $K_2CO_3$ | 99% purity | — | — | — | — | — |
| 2. | Silica-alumina | $SiO_2:Al_2O_3$ = 33:62 | 250 | 0.91 | 136 | 2.1 | 93 |

44.5 ml of water, equivalent to the pore volume of the support was taken and $K_2CO_3$ was dissolved in this water to prepare a saturated solution. Afterwards, 50 gms of silica-alumina support particles were added to the aqueous solution in order to fill the pores and dried at 80° C. and then again dried under reduced pressure for 12 hrs at 130° C. The properties of the silica-alumina supported $K_2CO_3$ catalyst are tabulated in Table 2 provided herein below.

TABLE 2

| Material | Surface area ($m^2/g$) | Pore vol ($cm^3/g$) | Pore Dia (°A) | Attrition Index (%) |
|---|---|---|---|---|
| Catalyst = 50% $K_2CO_3$ on Silica-Alumina support | 60 | 0.25 | 112 | 5.2 |

(c) Gasification of char

Two different types of char, one—as prepared in Experiment 1(a) and second—commercially available char, were used for the gasification process. Gasification of char was carried out in the system of the present disclosure, comprising a tubular reactor (type of the second reactor (300)), at a temperature of 790° C. Experiments were conducted under both non-catalytic and catalytic conditions. In the case of catalytic gasification/reaction, the tubular reactor was loaded with 2 gms of char and 20 gms of catalyst comprising 50% $K_2CO_3$ impregnated on silica-alumina support; whereas, in the case of non-catalytic reaction, the tubular reactor was loaded with 2 gms of char and 20 gms mixture of inert solids whose weight was equal to that of the char catalyst mixture. Further, the tubular reactor was heated to a temperature of 790° C. and a pressure of 1 bar was maintained therein under nitrogen gas flow. After attaining the reaction temperature of 790° C., nitrogen supply to the tubular reactor was stopped and steam (water flow 1.2 gm/min) was introduced into the tubular reactor. The produced gaseous mixture was collected and analyzed with gas chromatography as shown in Table 3 provided herein below. The experiment was conducted for both the char, as obtained from Experiment 1(a) and commercially available (from entrained bed gasifier), and the results thus obtained are summarized in Table 3 provided herein below.

TABLE 3

| Conditions | Type of char | Reaction Pressure (bar) | Reaction Temp. (° C.) | Catalyst to char ratio | Conversion (%) | Reaction time (min) | Prodcut Gas Compostion, mol %, $H_2/CO/CO_2/CH_4$ |
|---|---|---|---|---|---|---|---|
| Non-catalytic | In-house | 1 | 790 | NA | <2 | 10 | 44/40/15/1 |
|  | Commercial | 1 | 800 | NA | <2 | 10 | 46/39/14/1 |
| Catalytic | In-house | 1 | 790 | 10 | 99 | 5 | 62/15/22/1 |
|  | commercial | 1 | 800 | 10 | 99 | 5 | 61/17/21/1 |

From Table 3, it is observed that under non-catalytic conditions, at a temperature of 790° C. the conversion of char was negligible (<2%); whereas, 99% conversion of the char, in-house char and commercially available char, was observed in the presence of the catalyst. It can be also seen that the $H_2/CO$ molar ratio is less than 1.2 in the product gas of thermal condition whereas, this ratio is greater than 3 in case of catalytic condition.

Experiment 2: Comparison of the Catalytic Activity of the Catalyst at Different Temperatures Experiments were carried out at different temperatures to check the activity of the catalyst for the gasification of char in the tubular reactor. The data obtained is summarized in Table 4 provided herein below.

TABLE 4

| S. No. | Reaction Pressure (bar) | Reaction Temp. (° C.) | Catalyst to char ratio | Conversion (%) | Reaction time (min) |
|---|---|---|---|---|---|
| 1. | 1 | 700 | 10 | 85 | 10 |
| 2. | 1 | 750 | 10 | 95 | 7 |
| 3. | 1 | 790 | 10 | 99 | 5 |

Table 4 illustrates the details of the time required for obtaining the respective char conversions at different temperatures in the presence of the catalyst. The amount of char used was 2 gms for each experiment and the catalyst to char ratio was 10. From Table 4, it is observed that the time required for the conversion from char to synthesis gas decreases as the reaction temperature increases. Higher conversion can be achieved at a higher temperature and at a reduced reaction time, for the given catalyst.

Experiment 3: Catalyst Activity at a Given Temperature with Different Catalyst to Char Ratio Experiment was conducted at different catalyst to char ratio and at 750° C. The data thus obtained is summarized in Table 5 provided herein below.

TABLE 5

| S. No. | Reaction Pressure (bar) | Reaction Temp. (° C.) | Catalyst to char ratio | Conversion (%) | Time for achieving the conversion (min) |
|---|---|---|---|---|---|
| 1. | 1 | 750 | 10 | 95 | 7 |
| 2. | 1 | 750 | 20 | 99 | 7 |
| 3. | 1 | 750 | 30 | 99 | 5 |

2 gms of char was taken for the experiments. From Table 5, it is observed that at a catalyst to char ratio of 10, the chat conversion was 95%. Further, it is observed that as the catalyst to char ratio increases, the % conversion of the char increases (i.e., maximum char conversion of 99%) in the presence of the catalyst.

From Table 5, it is evident that char can be completely converted into synthesis gas in the presence of the catalyst at 750° C., without any issues of loss of the catalyst and regeneration thereof and moreover, the activity of the catalyst remains unchanged during the conversion of char to synthesis gas.

Experiment 4: Effect of High Pressures

Experiments were carried out at different pressures ranging from 30 to 40 bars and different temperatures ranging from 600° C. to 700° C. in a high pressure fixed bed reactor unit (second reactor (300)). The reactor had an inner diameter of 2.54 cm and a height of 70 cm. The reactor was loaded with the catalyst (50% $K_2CO_3$ supported on silica-alumina) and char. The reaction was carried out under the inert atmosphere of argon. After attaining the desired reaction temperature, steam was injected into the reactor for about 10 minutes and then the reactor was cooled to room temperature. Further, the reactor was depressurized to atmospheric pressure, and the produced, synthesis gas was collected and analyzed with gas chromatography. The spent catalyst was analyzed to get the amount of unconverted carbon for estimating the carbon conversion in the specific experimental run.

TABLE 6

| S. No. | Reaction Pressure (bar) | Reaction Temp. (° C.) | Feed Type | Feed (gm) | Catalyst to char ratio | Conversion (%) | Reaction time period (min) |
|---|---|---|---|---|---|---|---|
| 1. | 40 | 600 | Biomass Char (wood sawdust) | 2 | 8 | 100 | 7 |
| 2. | 40 | 650 | Coal Char (Sub-bituminous coal) | 1 | 30 | 81 | 10 |
| 3. | 30 | 700 | Coke Char (Petcoke) | 1 | 40 | 88 | 10 |

From Table 6 it is observed that complete conversion of the char was obtained for biomass char in 7 minutes, at a significantly lower temperature, i.e., at 600° C. and 40 bar pressure; whereas, it took 10 mins to get the 81% conversion of coal char at 650° C. and 40 bar pressure. Further, in case of petcoke, 88% conversion was achieved in 10 mins. Therefore, the catalyst of the present disclosure facilitates in achieving higher conversion of the char at high pressure conditions.

Experiment 5: Adsorption Capacity of the Catalyst for Volatile Heavy Metal(s)

An experiment was conducted to verify the adsorption of vanadium by using the catalyst, i.e., 50% $K_2CO_3$ impregnated on silica-alumina support, prepared in experiment 1(b).

10 gms of the catalyst was introduced in the reactor (particularly a bottom bed of the reactor) and 5 gms of ammonium meta vanadate (source of vanadium) was introduced from a top portion of the reactor. A thin layer of an inert glass wool was kept between the vanadium source and the catalyst layers. The reactor was then heated to 790° C. for 1 hour in the presence of continuous nitrogen purging from the top portion of the reactor. Further, the reactor was cooled and the catalyst was analyzed by using Inductively Coupled Plasma analyzer (ICP) so as to check the presence of vanadium in the catalyst. It was found that 1500 ppm of vanadium content was present in the catalyst. Thus, the catalyst acts as an adsorbent for vanadium, which if not removed or adsorbed can cause fouling in the downstream process equipment such as heat exchangers.

Experiment 6: Enhancement of $H_2/CO$ Ratio of Product Gas in Presence of Catalyst An experiment was conducted to verify the catalyst activity for the water gas shift reaction by using the same catalyst, i.e., 50% $K_2CO_3$ impregnated on silica-alumina support, prepared in experiment 1(b).

10 gms of the catalyst was introduced in the reactor (second reactor (300) and the reactor was heated, up to a temperature of 700° C. in the presence of inert atmosphere of argon in a similar manner like previous experiments. After attaining the desired reaction temperature, steam was injected (water flow 0.5 gm/min) along with the CO (100 ml/min) into the reactor. The entire product gas was collected for 10 minutes and the gas was analysed for composition. The product gas compostions as follows: $H_2$:43 mol %, CO:14 mol % and $CO_2$:43 mol %. This experiments confirmed that the catalyst is capable of accelerating the kinetics of water gas shift reaction significantly at a temperature of 700° C.

Technical Advances and Economical Significance

The present disclosure described herein above has several technical advantages including, but not limited to, the realization of a process and a system that:
  are capable of achieving the conversion efficiency of the unreacted char to syngas greater than 90%;
  increasing the $H_2/CO$ molar ratio in the product gas significantly
  uses a catalyst system, particularly $K_2CO_3$ impregnated silica-alumina support, which acts as an adsorbent to adsorb volatile heavy metals such as vanadium and nickel thereon, thereby reducing fouling in the downstream units; and
  are economical and efficient.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and am not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from she principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for producing synthesis gas with increased $H_2$ to CO molar ratio from a carbonaceous feedstock, said process comprising the following steps:
  gasifying said carbonaceous feedstock in a first reactor (100), in the presence of oxygen and steam, at a temperature in the range of 850° C. to 1800° C. and at a pressure in the range of 1 bar to 60 bar, to obtain a gaseous mixture comprising $H_2$, CO, $CH_4$, $CO_2$, $H_2O$, tar and char where the $H_2$ to CO molar ratio is less than 1.2 wherein said carbonaceous feedstock is gasified in a primary zone of said first reactor in the absence of a catalyst; and
  further gasifying said gaseous mixture in a second reactor (300) with at least one of steam, $CO_2$, CO and hydrogen, in the presence of a catalyst comprising alkali metal salt impregnated on silica-alumina support and, at a temperature in the range of 600° C. to 850° C. and at a pressure in the range of 1 bar to 60 bar, to obtain synthesis gas with $H_2/CO$ molar ratio being in the range of 1.5 to 6;
wherein said alkali metal salt is $K_2CO_3$ and the amount of $K_2CO_3$ is in the range of 10 wt % to 60 wt % of the total catalyst composition;
wherein the gaseous mixture obtained from said first reactor is cooled to a temperature less than 800° C., before introducing said gaseous mixture into said second reactor;

wherein said process comprises capturing heavy metals including vanadium and nickel from said gaseous mixture with said catalyst;
wherein the residence time or said carbonaceous feedstock in said first reactor is in the range 5 seconds to 300 seconds; and
wherein the residence time of said gaseous mixture in said second reactor is in the range 60 to 600 seconds.

2. The process as claimed in claim 1, wherein:
  i. said carbonaceous feedstock is gasified in a primary zone of said first reactor having a temperature in the range of 900° C. to 1800° C. in the absence of the catalyst; and
  ii. an additional portion of said carbonaceous feedstock is gasified in a secondary zone of said first reactor having a temperature in the range of 850° C. to 1700° C.

3. The process as claimed in claim 1, wherein:
the molar ratio of steam to said carbonaceous feedstock in said first reactor is in the range of 1:1 to 1:4; and
the mass ratio of said catalyst to said gaseous mixture in said second reactor is in the range of 5:1 to 60:1.

4. The process as claimed in claim 1, wherein the conversion efficiency of char and tar to the synthesis gas in said second reactor is greater than 90%.

5. The process as claimed in claim 1, wherein said carbonaceous material is at least one selected from the group consisting of petroleum coke, coal, petroleum residue, biomass and wood.

\* \* \* \* \*